T. J. FEALY.
CAKE-CUTTER.
No. 192,244. Patented June 19, 1877.
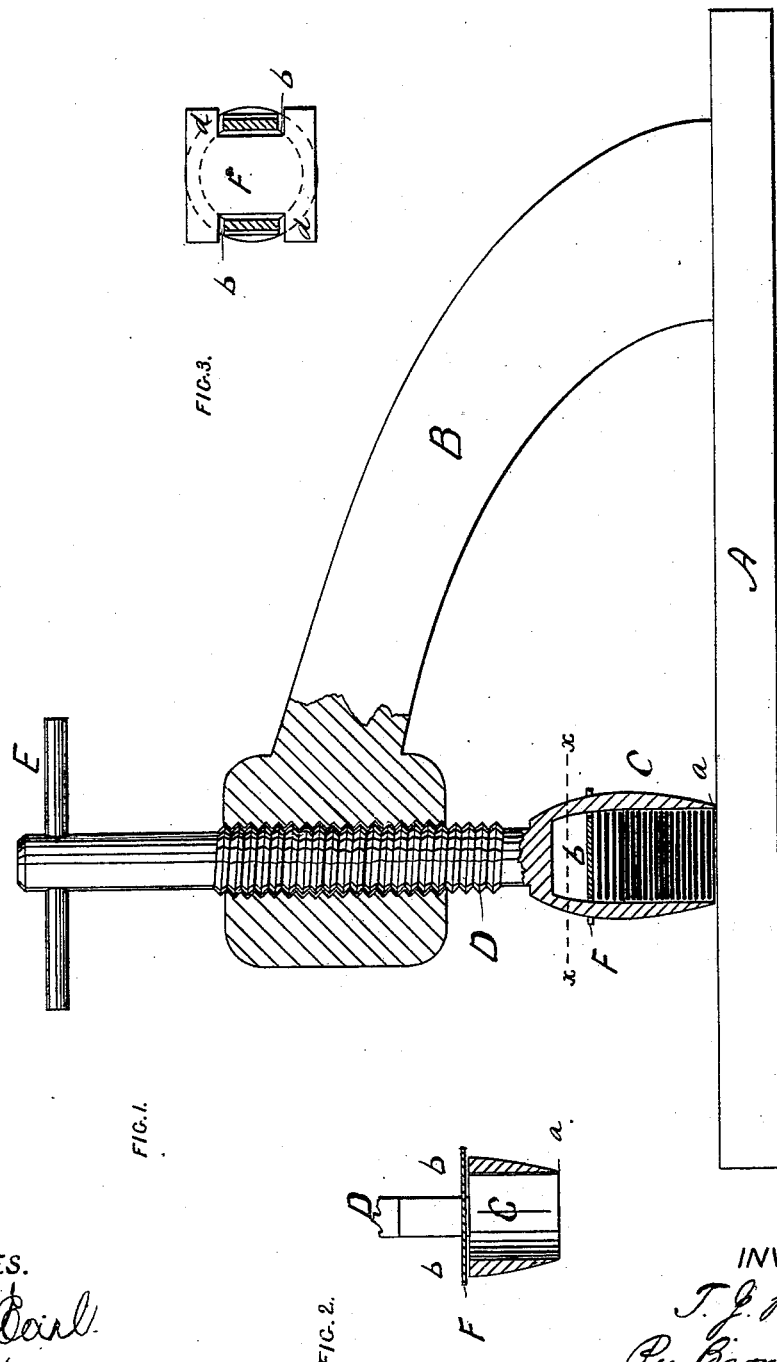
WITNESSES.
INVENTOR.

UNITED STATES PATENT OFFICE.

TIMOTHY J. FEALY, OF BOSTON, MASSACHUSETTS.

IMPROVEMENT IN CAKE-CUTTERS.

Specification forming part of Letters Patent No. 192,244, dated June 19, 1877; application filed May 1, 1877.

*To all whom it may concern:*

Be it known that I, TIMOTHY J. FEALY, of Boston, in the county of Suffolk and State of Massachusetts, have invented an Improved Cutter for Cutting Out Wafers or Altar-Bread, of which the following is a specification:

This invention relates to a cutter for use in cutting out wafers or altar-bread, to be used in administering the sacrament or communion in churches where wafers are used for such purpose; and the invention is constructed and arranged for operation substantially as hereinafter fully described.

In the accompanying plate of drawings, Figures 1 and 2 are vertical sections of the present invention, and Fig. 3 is a horizontal cross-section on line $x\, x$, Figs. 1 and 2.

A in the drawings represents a bed-plate, on which is supported the arm B; C, a cutter, rigidly attached in any suitable manner to the lower end of a screw, D, whereby the cutter C can be moved up and down vertically by turning the screw D by its handle E.

The cutter C is of tubular form, and is to be properly sharpened at its lower edge $a$. The cutter has openings $b$ in its sides opposite to each other, as shown more particularly in Fig. 2. F, a plate arranged in the cutter so that it can be moved up and down in the openings $b$, and having flanged ends $d$ to prevent its displacement.

The operation of the cutter is as follows: The material to be cut into wafers, having been properly prepared and of the required thickness, is placed on the bed-plate A under the cutter C, which is first raised out of the way.

By the handle E, turn the screw downward, which revolves and lowers the cutter to the plate, and in its movements a wafer is cut from the material. Turning the screw in a reverse direction raises the cutter from the plate, and the material is then moved laterally on the bed-plate to present another portion of the materal being cut to the action of the cutter, when the cutting operation is continued as before, and so on until the number of wafers required for use is cut.

As the wafers are thus cut they gradually rise and fill the cutter, as shown in Fig. 1, and also raise the plate F, which is to prevent, by its resting on them, as shown, their accidental displacement from the cutter until it is desired to remove them, when they can be carefully removed through one of the openings $b$.

By securing the cutter C to a screw, D, a circular and a drawing cut is given to the cutter, thereby making a sharp and clean cut of the edge of the wafer, which improves its appearance when used.

The material, having been prepared, is first baked and then cut into the wafer-form.

The bed-plate A can be of wood or metal, although wood is desirable, as it will not dull the cutter; and a separate plate or board can be laid on the bed-plate to be used as a cutting-board.

If the cutter and the screw should become out of line perpendicularly to the surface of the cutting-plate, a separate plate can be arranged and adapted by screws, &c., so that it can be adjusted to the right angle to the axial line of the screw for a proper use of the cutter. By the use of a separate board or plate for a cutter to act upon it can easily be moved sidewise, so that a new portion of the cutting board or plate can be presented to the cutter as it becomes worn from use.

Having thus described my invention, what I claim, and desire to secure by Letters Patent, is—

1. The cutter C, attached to the screw D, and adapted to rotate therewith while being forced through the material in order to give a circular and drawing cut, as and for the purposes specified.

2. In combination with a cutter, C, the plate F, arranged for operation substantially as and for the purpose specified.

TIMOTHY J. FEALY.

Witnesses:
EDWIN W. BROWN,
GEO. H. EARL.